(12) United States Patent  (10) Patent No.: US 7,113,187 B1
Kikinis  (45) Date of Patent: Sep. 26, 2006

(54) METHOD AND SYSTEM FOR LOCALIZED ADVERTISING USING LOCALIZED 3-D TEMPLATES

(76) Inventor: Dan Kikinis, 20264 Ljepava Dr., Saratoga, CA (US) 95070

( * ) Notice: Subject to any disclaimer, the term of this patent is extended or adjusted under 35 U.S.C. 154(b) by 130 days.

(21) Appl. No.: 09/782,916

(22) Filed: Feb. 13, 2001

Related U.S. Application Data

(60) Provisional application No. 60/204,875, filed on May 16, 2000, provisional application No. 60/203,496, filed on May 11, 2000.

(51) Int. Cl.
    *G06T 15/00* (2006.01)
(52) U.S. Cl. .................. 345/426; 345/629; 358/183
(58) Field of Classification Search ........ 345/629–634, 345/636–638, 426; 358/183; 725/39
    See application file for complete search history.

(56) References Cited

U.S. PATENT DOCUMENTS

| | | | |
|---|---|---|---|
| 5,264,933 A * | 11/1993 | Rosser et al. ............... | 358/183 |
| 5,414,773 A | 5/1995 | Handelman | |
| 5,479,268 A | 12/1995 | Young et al. | |
| 5,532,754 A | 7/1996 | Young et al. | |
| 5,550,576 A | 8/1996 | Klosterman | |
| 5,684,525 A | 11/1997 | Klosterman | |
| 5,737,028 A | 4/1998 | Bertram et al. | |
| 5,751,282 A | 5/1998 | Girard et al. | |
| 5,808,613 A | 9/1998 | Marrin et al. | |
| 5,818,441 A | 10/1998 | Throckmorton et al. | |
| 5,828,945 A | 10/1998 | Klosterman | |
| 5,841,563 A | 11/1998 | Effenberger | |
| 5,900,915 A | 5/1999 | Morrison | |
| 5,923,362 A | 7/1999 | Klosterman | |
| 5,926,168 A | 7/1999 | Fan | |
| 5,929,849 A | 7/1999 | Kikinis | |
| 5,940,073 A | 8/1999 | Klosterman et al. | |
| 5,956,456 A | 9/1999 | Bang et al. | |
| 5,999,167 A | 12/1999 | Marsh et al. | |
| 6,002,403 A | 12/1999 | Sugiyama et al. | |
| 6,029,195 A | 2/2000 | Herz | |
| 6,072,983 A | 6/2000 | Klosterman | |
| 6,075,575 A | 6/2000 | Schein et al. | |
| 6,078,348 A | 6/2000 | Klosterman et al. | |
| 6,167,188 A | 12/2000 | Young et al. | |
| 6,205,485 B1 | 3/2001 | Kikinis | |
| 6,233,389 B1 | 5/2001 | Barton et al. | |
| 6,271,831 B1 | 8/2001 | Escobosa et al. | |
| 6,446,261 B1 * | 9/2002 | Rosser ..................... | 725/34 |

FOREIGN PATENT DOCUMENTS

JP   410093880 A   4/1998
WO   WO 00/01149 A1   1/2000

* cited by examiner

*Primary Examiner*—Phu K. Nguyen
(74) *Attorney, Agent, or Firm*—Todd S. Parkhurst; Holland & Knight LLP (57) ABSTRACT

A method and system for localized advertising using localized 3-D templates is disclosed. In one embodiment, a method for providing enhanced advertising of a 2-D video broadcast, comprises receiving the 2-D video broadcast, wherein the 2-D video broadcast comprises a 2-D advertisement containing a 2-D image, and one or more 3-D shapes of text; generating a 3-D highlighted image from the 2-D image; applying the 3-D shapes of text to the 3-D highlighted image to generate a localized 3-D highlighted image; and displaying the localized 3-D highlighted image to a specific viewer.

24 Claims, 6 Drawing Sheets

METHOD AND SYSTEM FOR LOCALIZED ADVERTISING USING LOCALIZED 3-D TEMPLATES

This patent claims priority based on U.S. Provisional Patent Application Ser. No. 60/203,496, filed on May 11, 2000, incorporated herein by reference; and U.S. Provisional Application Ser. No. 60/204,875, filed on May 16, 2000, incorporated herein by reference.

FIELD OF THE INVENTION

The present invention relates generally to the field of video processing systems, and, more specifically, to a method and system for localized advertising using localized 3-D templates.

BACKGROUND OF THE INVENTION

During the process of video and image editing, one alters portions or all of a video image, e.g. by moving an image from one portion of a screen to another, rotating the image, expanding the image or shrinking the image. Other common image manipulations include warping an image (i.e. deforming the image in three dimensions), magnifying parts of an image, performing cylindrical, spherical, hyperbolic, or parabolic transformations to the image (e.g. causing a two-dimensional image to appear to bend or wrap around a cylindrical, spherical, hyperbolic or parabolic surface), melting images, etc. Parabolic transformations may be used to provide a three dimensional (3-D) effect.

Frequently, the image to be manipulated is in the form of a pixel array. In other words, the image is stored as an array of data values, each value corresponding to the color and brightness of a small area of the image. When performing the above-mentioned video image manipulations, one typically performs calculations to transform every pixel of the image. For example, for each pixel of the image, one performs calculations to determine a new location for that pixel on a video screen. Large images can contain millions of pixels. Further, for the case of image streams (e.g. as in the case of video images), dozens of frames per second must be transformed. Thus, many millions of pixels may have to be analyzed and modified for each transformation in a very short amount of time. Such transformations require either enormous CPU resources or special hardware to be able to transform large numbers of pixels in a short amount of time.

Although some 3-D video standards are already developed and have, for example, been included in the Motion Picture Experts Group 4 (MPEG4) video standard, these standards require specialized transmission systems, players, etc., which may not be installed into common commercial video broadcasting systems for a long time.

In addition, the amount of data transmitted in real 3-D video broadcasting on a regular basis is so large that it can be overwhelming for present-day delivery systems and for systems anticipated in the near future.

Furthermore, 2-D television broadcasts include 2-D advertisements that are not viewer specific. For example, the advertisement may be nationally broadcast, but not localized to a specific viewer or localized group of viewers.

SUMMARY OF THE INVENTION

A method and system for localized advertising using localized 3-D templates is disclosed. In one embodiment, a method for providing enhanced advertising of a 2-D video broadcast, comprises receiving the 2-D video broadcast, wherein the 2-D video broadcast comprises a 2-D advertisement containing a 2-D image, and one or more 3-D shapes of text; generating a 3-D highlighted image from the 2-D image; applying the 3-D shapes of text to the 3-D highlighted image to generate a localized 3-D highlighted image; and displaying the localized 3-D highlighted image to a specific viewer.

Other features of the present invention will be apparent from the accompanying drawings and from the detailed description, which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and system for localized advertising using localized 3-D templates, is described. In the following description, for purposes of explanation, numerous specific details are set forth in order to provide a thorough understanding of the present invention. It will be evident, however, to one skilled in the art that the present invention may be practiced without these specific details.

In the following description, for purposes of explanation, numerous specific details are set forth in order to provide a thorough understanding of the present invention. It will be evident, however, to one skilled in the art that the present invention may be practiced without these specific details. In some instances, well-known structures and devices are shown in block diagram form, rather than in detail, in order to avoid obscuring the present invention. These embodiments are described in sufficient detail to enable those skilled in the art to practice the invention. It is to be understood that other embodiments may be utilized and that logical, software, re-ordering of steps, and other changes may be made without departing from the scope of the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm as described here, is generally conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention can be implemented by an apparatus for performing the operations herein. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method. For example, any of the methods according to the present invention can be implemented in hard-wired circuitry, by programming a general purpose processor or by any combination of hardware and software. One of skill in the art will immediately appreciate that the invention can be practiced with computer system configurations other than those described below, including hand-held devices, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network. The required structure for a variety of these systems will appear from the description below.

The methods of the invention may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application . . . ), as taking an action or causing a result. Such expressions are merely a shorthand way of saying that execution of the software by a computer causes the processor of the computer to perform an action or produce a result.

Figure 1:
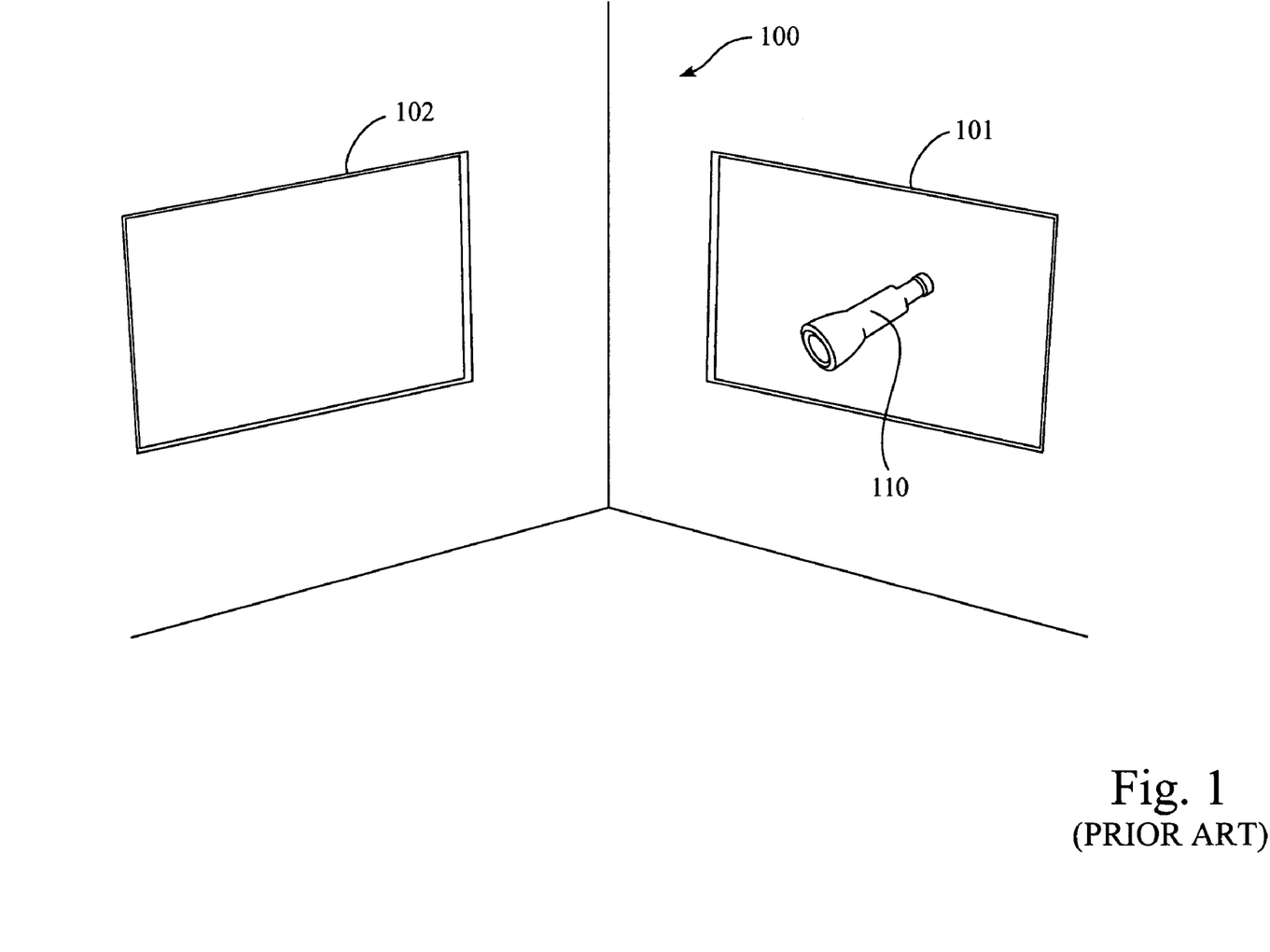
FIG. 1 illustrates an exemplary prior art 2-D advertisement display.

FIG. 1 illustrates an exemplary prior art 2-D advertisement display. More specifically, FIG. 1 shows a pseudo 3-D view of a split screen in virtual room 100 with two screens 101 and 102 as flat geometric surfaces suspended on the walls of the room.

On screen 101 an advertisement for Coca Cola, for example, is running, with Coke bottle 110 visible. Even though this is a virtual 3-D world, because the video source is a 2-D source, virtual screen 101, is essentially flat or slightly cylindrical, and displays a simple object. Although one of ordinary skill in the art may use color information, etc., to derive a Z component for such a flat object, the results could be rather strange in some cases, because color can change with the lighting when advertisements are video taped. Typically, such advertisements may have enhanced special lighting effects, which in such cases can result in very strange deformations of the object.

Figure 2:
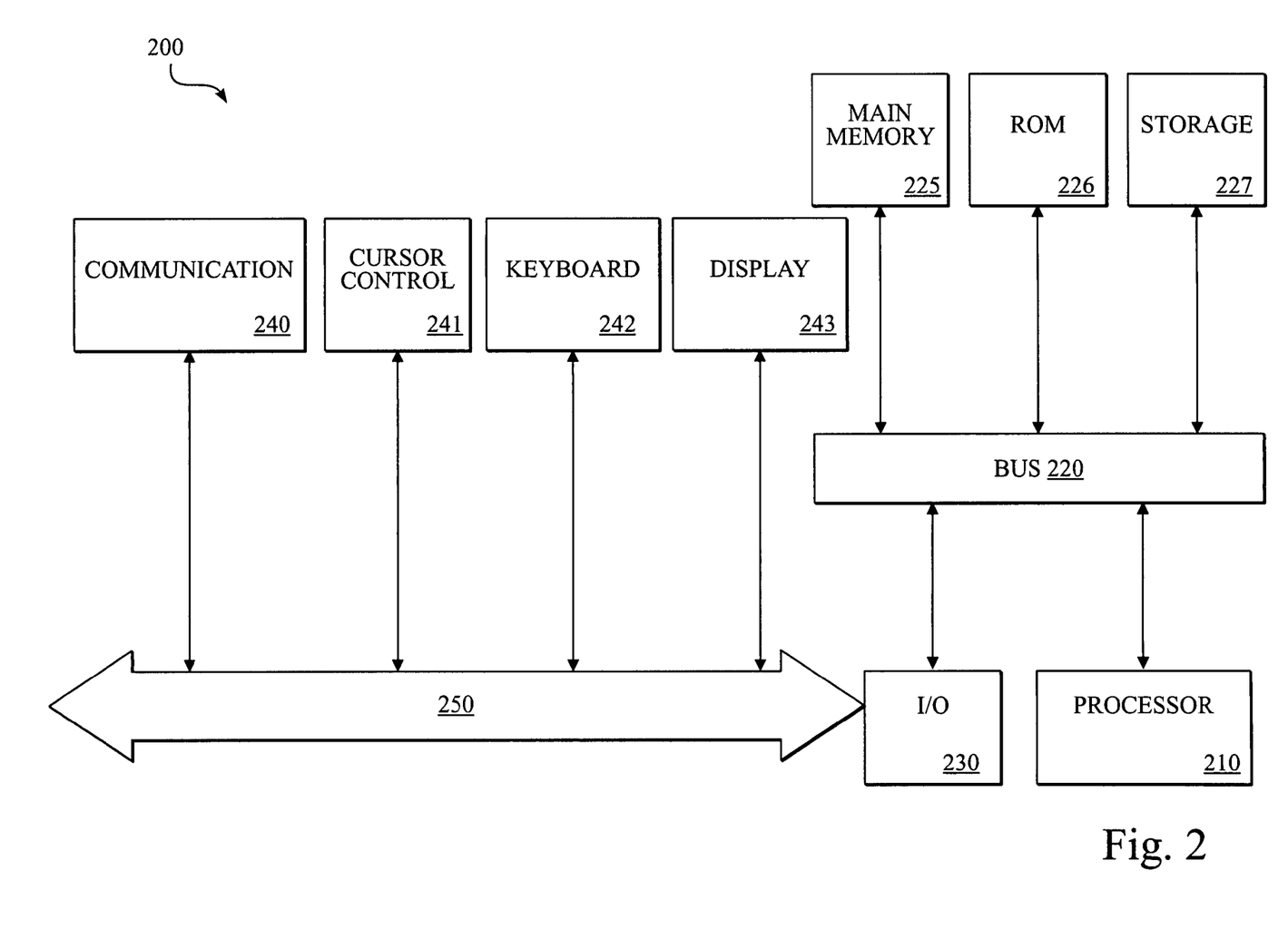
FIG. 2 illustrates an exemplary computer architecture 200 used to implement the present 3-D enhanced advertising method.

FIG. 2 illustrates an exemplary computer architecture 200 used to implement the present 3-D enhanced advertising method. Architecture 200 represents an integrated multi-processor, in which elements of the present method and system for providing 3-D enhanced advertising may be implemented. Architecture 200 may be a set top box, computer, or similar device. One embodiment of computer architecture 200 comprises a system bus 220 for communicating information, and a processor 210 coupled to bus 220 for processing information. Computer architecture 200 further comprises a random access memory (RAM) or other dynamic storage device 225 (referred to herein as main memory), coupled to bus 220 for storing information and instructions to be executed by processor 210. Main memory 225 also may be used for storing temporary variables or other intermediate information during execution of instructions by processor 210. Computer architecture 200 also may include a read only memory (ROM) and/or other static storage device 226 coupled to bus 220 for storing static information and instructions used by processor 210.

A data storage device 227 such as a magnetic disk or optical disc and its corresponding drive may also be coupled to computer architecture 200 for storing information and instructions. Computer architecture 200 can also be coupled to a second I/O bus 250 via an I/O interface 230. A plurality of I/O devices may be coupled to I/O bus 250, including a display device 243, an input device (e.g., an alphanumeric input device 242 and/or a cursor control device 241). Display device 243 may be a television, computer monitor, or liquid crystal display. The input device may also 10' include a keyboard, mouse, trackball, or remote controller.

The communication device 240 is for accessing other computers via a network. The communication device 240 may comprise a modem, a network interface card, or other well known interface device, such as those used for coupling to Ethernet, token ring, or other types of networks, including the internet.

Figure 3:
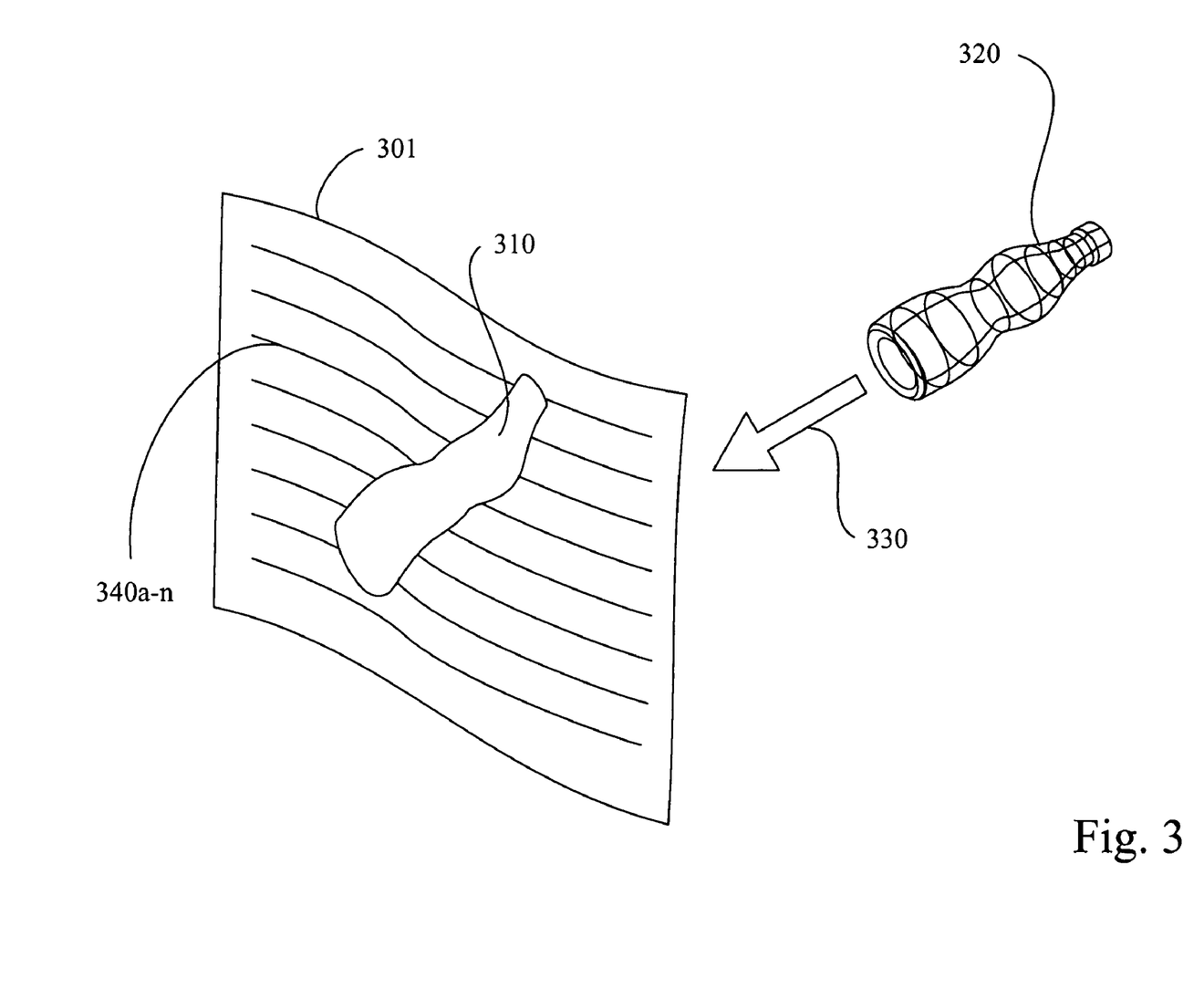
FIG. 3 illustrates an exemplary approach to the present method.

FIG. 3 illustrates an exemplary approach to the present method. Screen 301 is shown with Coke bottle 310 on it. Screen 301 is flat and rectangular in one embodiment. However in alternate embodiments screen 301 may be a different shape and contoured. For example, screen 301 may have a cylindrical or spherical warp to it, or it may be wrapped onto some other object, such as a column, but essentially the surface is similar to a flat sheet of paper. Also, a limited number of horizontal grid lines 340 a through n are symbolized, which go straight through Coke bottle 310, indicating that the image of the bottle 310 is a flat geometric surface. Gridlines 140 a–n may not be visible to a viewer.

In addition, a web link may be incorporated into the Coke bottle to display additional information to allow the viewer to surf to a local shopping outlet. As the ad is playing, this link may, for example, also be used to identify object 310 in the ad and to refer to a look-up table to see if there is a 3-D object corresponding to object 310 in a library that is local in the viewer's set-top box, or computer having an architecture 200. That library may be broadcast to all set-top boxes on the broadcasting system on a regular basis and updated, or it may be loaded over the Internet or any other type of network connection including all known caching and buffering techniques.

3-D object 320 has a matching ID to coke bottle 310. In a visualized form, object 320 may be pushed with arrow 330 into flat geometric surface 301 so as to deform it.

Figure 4:
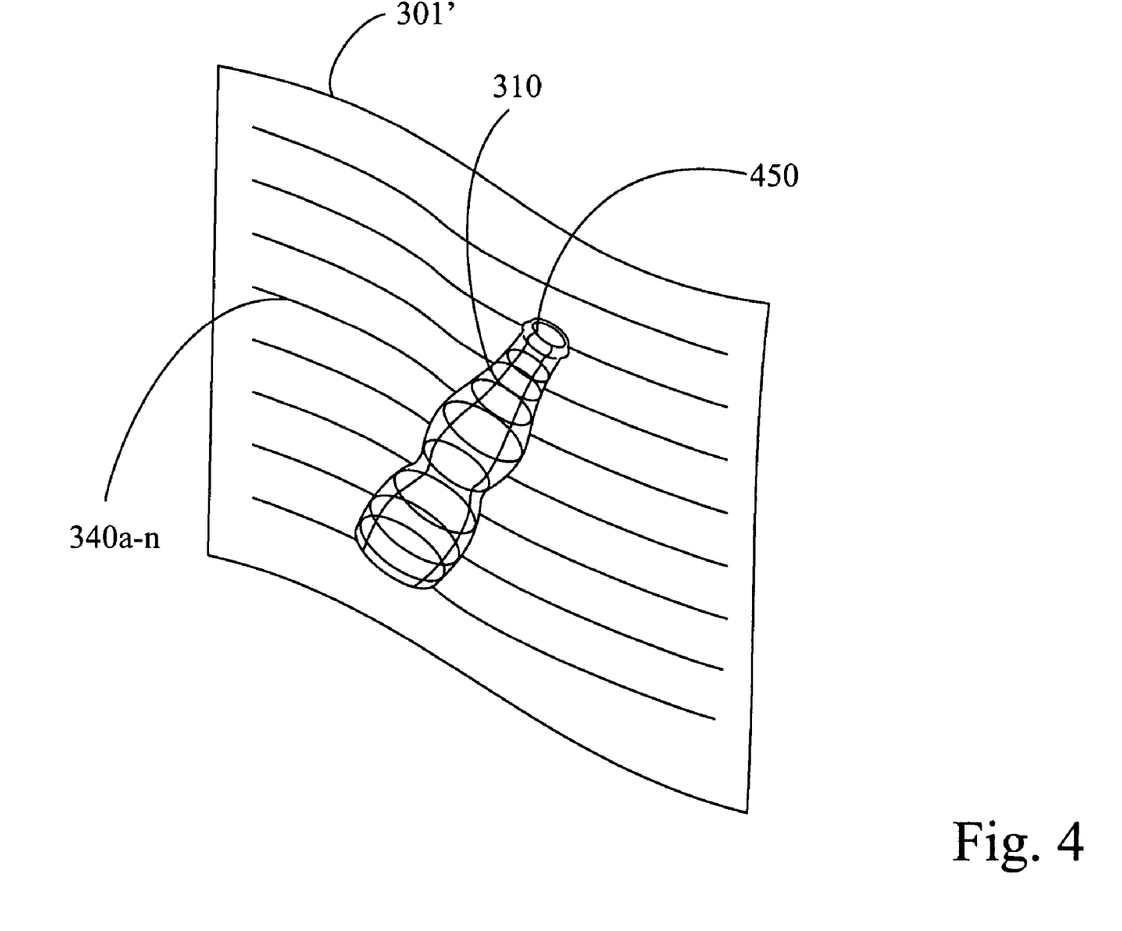
FIG. 4 illustrates an exemplary advertisement display having a S-D highlighted rendering.

FIG. 4 illustrates an exemplary advertisement display having a 3-D highlighted rendering. FIG. 4 shows the resulting deformation that has a half Coke bottle pushed out of the flat geometric surface into shape 450 shown in the deformation of grid lines 340 a through n on surface 301'.

Still overlaid on the correct location is the image of actual Coke bottle 310, so the video image is preserved, and by overlaying shades and specular lighting, the visual enhancement of the object can heightened.

As a result, it is possible to create a visual impression that makes the advertised object appear to be practically jumping out of the screen at the viewer.

Figure 5:
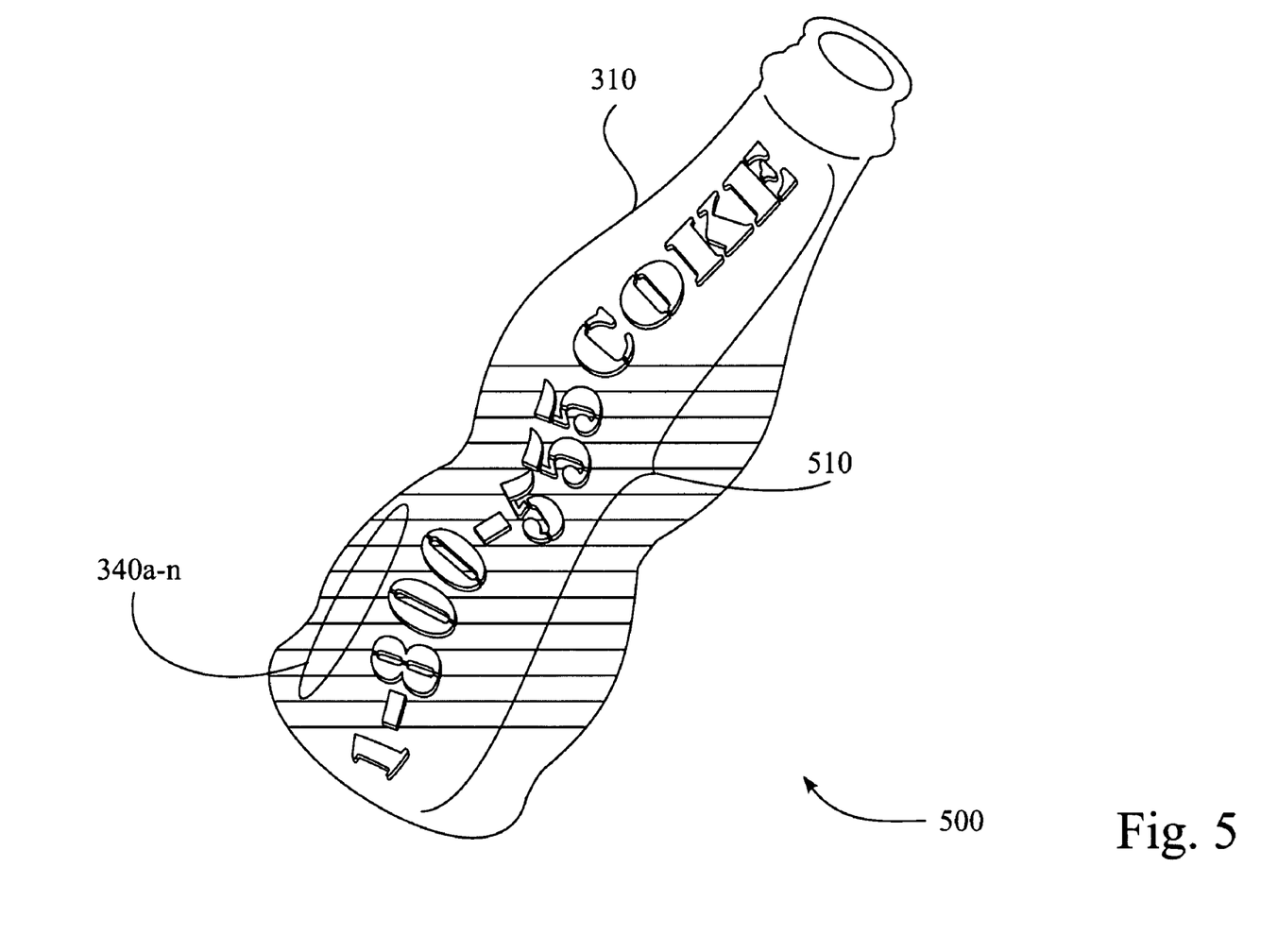
FIG. 5 illustrates an exemplary localized advertisement 500 with 3-D enhancement.

FIG. 5 illustrates an exemplary localized advertisement 500 with 3-D enhancement. Prior art systems and methods of localizing advertisements involve the broadcasting of specific character-based text to the set-top boxes of specific individual viewers or localized viewer groups. Localized advertisement 500 includes a localized 3-D image (coke bottle 310) in which viewer specific phone number 510 is visible, however specific character-based text is not broadcast. Instead, 3-D shapes of text, such as, phone number 510 are broadcast to the specific viewer's set-top box. In addition, the geometry of the 3-D shape (coke bottle 310), is altered in one of several ways to create the readable 3-D text shapes or characters.

Advertisement 500 includes lines 140 a–n, which symbolize mesh lines going through the volume of the bottle. The area of coke bottle 310 that displays phone number 510 also represents a template. In advertisement 500, the template has been cut out of the mesh 140 a–n, creating textual sized openings in mesh 140 a–n. Mesh 140 a–n may no longer be a continuous geometric surface at the areas covered by the template. Since coke bottle 310 is a 3-D image, the template allows the background that lies behind the mesh to be visible. If no background color is specified, a default color may be used, such as black. In one embodiment, a special contrast color may be displayed, generating highlighted text 510. Although text 510 displays "1-800-555coke", any similar image may be placed within advertisement 500 in any orientation.

In an alternate embodiment, rather than cutting out portions of mesh 140 a–n, characters, such as text 510, may be embossed into mesh 140 a–n. Embossed coke bottle 310 will include continuous mesh 140 a–n, however, mesh 140 a–n will be deformed. For example, to create embossed character images, the level of the mesh will be pushed back to a predetermined distance. That distance may be flush with screen 101. As a result, with appropriate specular shading and lighting, the embossed character image appears shadowed, and/or in a specific color.

In yet another embodiment, text 510 may be raised character images. For example, a raised character image appears visually even closer to the viewer. In addition the raised image may be increased in size, or with additional enhancements to color.

Thus, specific mesh geometries (3-D shapes of images) may be sent to set-top boxes, no actual characters are sent. Furthermore, multiple mesh geometries may be sent, each containing a unique identifier, which when interpreted by the receiving set-top box, allows the set-top box to select the specific mesh geometric for the specific viewer.

In an alternate embodiment, a set top box may store a library of mesh geometries, and the broadcast sends a unique identifier to indicate the appropriate mesh to be used.

Figure 6:
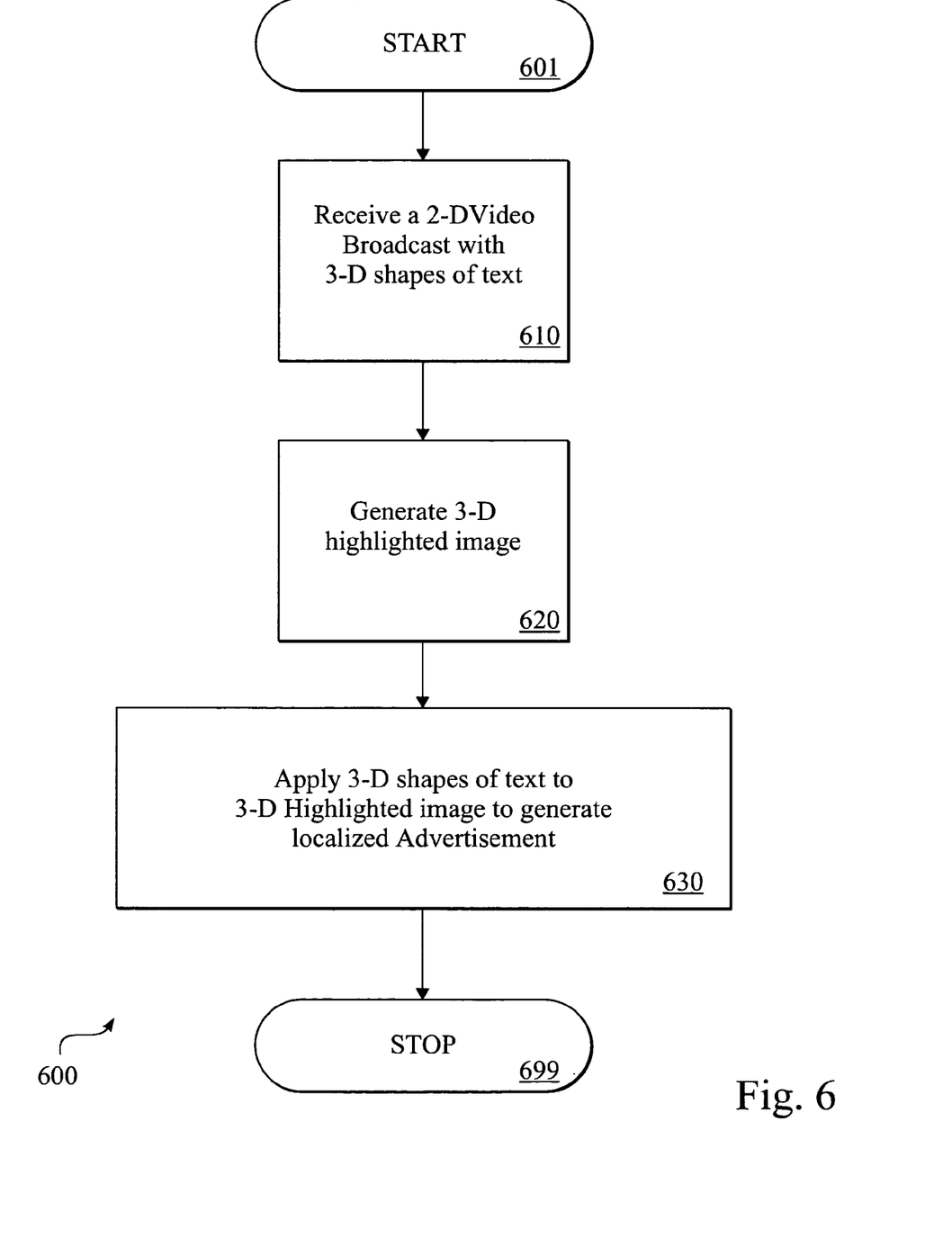
FIG. 6 illustrates an exemplary flow diagram of the process performed by architecture 200 for providing 3-D enhanced localized advertising.

FIG. 6 illustrates an exemplary flow diagram of the process performed by architecture 200 for providing 3-D enhanced localized advertising. The process starts at block 601. At processing block 610, architecture 200 receives a 2-D video broadcast. The video broadcast contains a 2-D advertisement in which there is at least one 2-D image. Also included are 3-D shapes of text. The advertisement may be for Coca-Cola and the 2-D image may be a coke bottle 310.

Flow continues to processing block 620, where architecture 200 generates a 3-D highlighted image according to the techniques described above. One of ordinary skill in the art may be able to render an image, according to the tecniques described in co pending application Ser. No. 10/004,737 filed on Dec. 4, 2004, now U.S. patent Ser. No. 6,525,728, entitled "Method and Apparatus for Using a General Three-Dimensional (3D) Graphics Pipeline for Cost Effective Digital Image and Video Editing, Transformation, and Representation" by Yakov Kamen and Leon Shirmar. At processing block 630, architecture 200 applies the 3-D shapes of text to the 3-D highlighted image 310. A localized advertisement is thus generated. [Dan, can you provide more information about where the localized data is generated?] The 3-D image rendered may contain specular lighting and shading. The resulting advertisement may be displayed by architecture 200 by a display 243, such as a television or monitor. The process ends at block 599.

The present techniques provide increased visual impact than conventional 2-D television broadcasting.

Thus, a method and system for localized advertising using localized 3-D templates have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method for providing enhanced advertising of a 2-D video broadcast, comprising:

receiving the 2-D video broadcast, wherein the 2-D video broadcast comprises a 2-D advertisement containing a 2-D image and one or more 3-D shapes of text;

generating a 3-D highlighted image from the 2-D image using a 3-D image and an image processor at the viewer's system;

applying the 3-D shapes of text to the 3-D highlighted image to generate a localized 3-D highlighted image; and displaying the localized 3-D highlighted image to a specific viewer.

2. The method according to claim 1, wherein applying the 3-D shapes of text comprises:

using the 3-D shapes of text as a template; and
cutting the 3-D highlighted image around the template.

3. The method according to claim 2, wherein applying the 3-D shapes of text further comprises displaying a color to contrast the 3-D highlighted image.

4. The method according to claim 1, wherein applying the 3-D shapes of text further comprises embossing the 3-D shapes of text within the 3-D highlighted image.

5. The method according to claim 1, wherein applying the 3-D shapes of text further comprises raising the 3-D shapes of text above the 3-D highlighted image.

6. The method according to claim 1, further comprising selecting a specific 3-D shapes of text for the specific viewer.

7. A system for providing enhanced advertising of a 2-D video broadcast, comprising:
   means for receiving the 2-D video broadcast, wherein the 2-D video broadcast comprises a 2-D advertisement containing a 2-D image, and one or more 3-D shapes of text;
   means at a viewer's system for generating a 3-D highlighted image from the 2-D image;
   means for applying the 3-D shapes of text to the 3-D highlighted image to generate a localized 3-D highlighted image; and
   means for displaying the localized 3-D highlighted image to a specific viewer.

8. The system according to claim 7, wherein the means for applying the 3-D shapes of text comprises:
   means for using the 3-D shapes of text as a template; and
   means for cutting the 3-D highlighted image around the template.

9. The system according to claim 8, wherein the means for applying the 3-D shapes of text further comprises means for displaying a color to contrast the 3-D highlighted image.

10. The system according to claim 7, wherein the means for applying the 3-D shapes of text further comprises means for embossing the 3-D shapes of text within the 3-D highlighted image.

11. The system according to claim 7, wherein the means for applying the 3-D shapes of text further comprises means for raising the 3-D shapes of text above the 3-D highlighted image.

12. The system according to claim 7, further comprising means for selecting a specific 3-D shapes of text for the specific viewer.

13. A computer-readable medium having stored thereon a plurality of instructions for providing enhanced advertising of a 2-D video broadcast, said plurality of instructions when executed by a computer, cause said computer to perform:
   receiving the 2-D video broadcast, wherein the 2-D video broadcast comprises a 2-D advertisement containing a 2-D image, and one or more 3-D shapes of text;
   generating a 3-D highlighted image from the 2-D image using an image processor at a viewer's system;
   applying the 3-D shapes of text to the 3-D highlighted image to generate a localized 3-D highlighted image; and
   displaying the localized 3-D highlighted image to a specific viewer.

14. The computer-readable medium of claim 13 having stored thereon additional instructions, said additional instructions when executed by a computer for applying the 3-D shapes of text, cause said computer to further perform:
   using the 3-D shapes of text as a template; and
   cutting the 3-D highlighted image around the template.

15. The computer-readable medium of claim 14 having stored thereon additional instructions, said additional instructions when executed by a computer for applying the 3-D shapes of text, cause said computer to further perform displaying a color to contrast the 3-D highlighted image.

16. The computer-readable medium of claim 13 having stored thereon additional instructions, said additional instructions when executed by a computer for applying the 3-D shapes of text, cause said computer to further perform embossing the 3-D shapes of text within the 3-D highlighted image.

17. The computer-readable medium of claim 13 having stored thereon additional instructions, said additional instructions when executed by a computer for applying the 3-D shapes of text, cause said computer to further perform raising the 3-D shapes of text above the 3-D highlighted image.

18. The computer readable medium according to claim 13, having stored thereon additional instructions, said additional instructions when executed by a computer, cause said computer to further perform selecting a specific 3-D shapes of text for the specific viewer.

19. A set top box for generating 3-D enhanced advertising from 2-D video broadcasts, comprising:
   a processor coupled to a bus; and
   a storage device coupled to the bus, wherein the storage device is configured to store instructions executed by the processor;
   wherein the processor receives the 2-D video broadcast, wherein the 2-D video broadcast comprises a 2-D advertisement containing a 2-D image, a unique identifier associated with said 2-D image and one or more 3-D shapes of text;
   generates a 3-D highlighted image from the 2-D image at a viewer's system based on said unique identifier; applies the 3-D shapes of text to the 3-D highlighted image to generate a localized 3-D highlighted image; and displays the localized 3-D highlighted image to a specific viewer.

20. The set top box of claim 19, wherein the processor uses the 3-D shapes of text as a template; and cuts the 3-D highlighted image around the template.

21. The set top box of claim 20 wherein the processor displays a color to contrast the 3-D highlighted image.

22. The set top box of claim 19, wherein the processor embosses the 3-D shapes of text within the 3-D highlighted image.

23. The set top box of claim 19, wherein the processor raises the 3-D shapes of text above the 3-D highlighted image.

24. The set top box of claim 19, wherein the processor selects a specific 3-D shapes of text for the specific viewer.

* * * * *